Nov. 8, 1932.  W. F. STUCKEMAN  1,887,220
GAUGE
Filed July 18, 1929
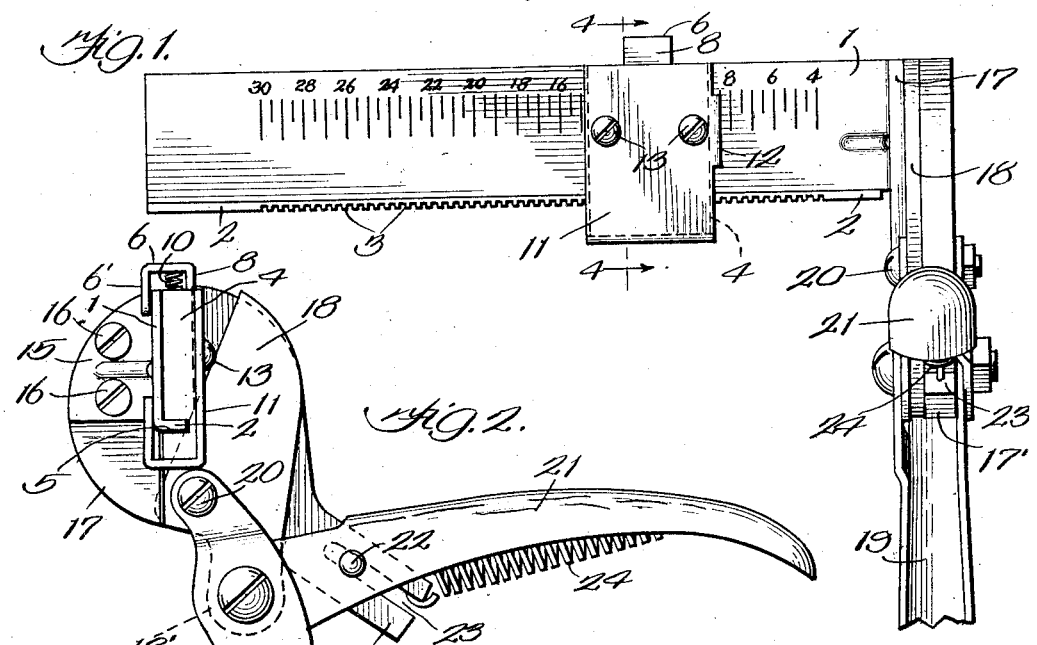
Inventor:
William F. Stuckeman Patented Nov. 8, 1932

1,887,220

UNITED STATES PATENT OFFICE

WILLIAM F. STUCKEMAN, OF CHICAGO, ILLINOIS, ASSIGNOR TO H. B. ROUSE & COMPANY, OF CHICAGO, ILLINOIS, A CORPORATION OF ILLINOIS

GAUGE

Application filed July 18, 1929. Serial No. 379,282.

My invention relates to gauges employing serrated bars or racks which bear measuring indices upon faces thereof, abutment blocks slidable along the gauge bars and detents for holding the blocks in selected positions with reference to the gauge bars. The invention has for one of its objects a simplification in the construction of the gauge bar, the gauge bar of my invention being angular in cross section to provide the bar with two angularly related sides extending lengthwise thereof, the outer face of one of said sides being serrated to constitute this bar side a rack.

The invention has for another object the improvement in the construction of the detent by which the abutment block is held in selected position. This detent is also in the form of a bar having two portions between which the gauge bar and block are disposed and a third portion between the first two that are angular to such third portion which extends transversely of the gauge bar and between which and the gauge bar a portion of said block is disposed, one of the first two aforesaid portions of the detent being in changeable engagement with the rack bar.

The invention also includes, as another of its characteristics, a slot in the abutment block in which the serrated side of the gauge bar is snugly received and which slot is entered by the gauge bar engaging end of the detent.

The invention has other characteristics and will be more fully explained in reference to the accompanying drawing in which Fig. 1 is a front view of the gauge of my invention shown in assembly with a hand cutter to form a tool which is adapted to cut lead and linotype slugs in measured lengths; Fig. 2 is an end view of the structure as it appears in Fig. 1; Fig. 3 is a plan view of the structure of Fig. 1 with parts broken away; Fig. 4 is a sectional view on line 4—4 of Fig. 1; Fig. 5 is a sectional view on line 5—5 of Fig. 4; Fig. 6 is a sectional view on line 6—6 of Fig. 5; and Fig. 7 is a perspective view of portions of the structure in separated relation with parts broken away and shown in section.

The gauge bar employed is angular in cross section to provide the bar with two angularly related sides 1 and 2. The side 1 has upon its inner broad face a series of measuring indices as indicated in Fig. 1. The side 2 has serrations 3 upon its outer face to constitute this side a rack. An abutment block 4 is slidable along the gauge bar, this abutment block being formed with a slot 5 in which the rack side 2 of the gauge bar is snugly received, so that the block is held substantially at right angles to the gauge bar side 2 throughout all positions of the block on such bar. A detent is carried by the block to hold the block in selected position on the gauge bar. This detent is itself in the form of a bar having two portions 6 and 7 between which the gauge bar is disposed and a third portion 8 between the portions 6 and 7. Said portions 6 and 7 are angular to the third portion 8 and this third portion extends transversely of the gauge bar and is positioned to have a part of the block 4 between it and the gauge bar. The detent portion 7 is formed with teeth 9 which are engageable with the rack 3 to hold the block 4 in selected position. A coiled spring 10 is interposed between the detent portion 6 and the block and serves yieldingly to hold the detent teeth 9 in engagement with the teeth 3. When it is desired to change the location of the block portion the detent is pressed downwardly upon to lower the teeth 9 out of engagement with the gauge bar whereafter the block may be moved along the gauge bar to the selected new position. The top and bottom walls of the slot 5 hold the block 4 substantially at right angles to the gauge bar side 2 in all positions of the block, the bottom side portions of the slot preventing the block from having material rocking movement with respect to said gauge bar side. The tooth end of the detent portion 7 enters the slot 5 and, being pressed upwardly by the spring 10, presses the top face of the gauge bar side 2 against the top wall of said slot. The detent portion 6 has a bent continuation 6' which laps and is in close proximity to the adjacent outer face of the gauge bar to prevent the block 4 from being moved sufficiently away from the inner and indices bearing face of the gauge bar sufficiently to allow the leads or slugs to enter between the block and gauge bar.

The abutment block desirably carries an abutment plate having a main body portion 11 parallel with the gauge bar and an ear 12 extending angularly to the gauge bar and lapping the gauge bar side 2 above this gauge side. The objects to be measured abut the ear 12. Screws 13 clamp the body of the abutment plate against the block. These screws pass through slots 14 in the abutment plate, whereby this abutment plate may be adjustable along the gauge bar with reference to the block. This feature enables the slug or other objects to be measured to be slightly over measured or slightly under measured or exactly measured, as desired.

The gauge of my invention is shown in combination with a cutting tool which enables objects that are placed against the abutment stop 12 to be cut to the length determined by this stop. The cutting tool illustrated is anchored to a wing 15 that is continued from one end of the gauge bar, screws 16 serving to clamp one of the jaw elements 17 of the cutter into assembly with the gauge bar. The other jaw element 18 of the cutter is pivoted upon the jaw 17. One operating handle 19 is fixed with respect to the jaw 18. The jaw 18 and the handle 19 are pivoted upon the jaw 17 by the pivot screw 20. Another operating handle 21 is pivoted to the handle 19 and to an extension 18' of the jaw 18. A pin 22 upon the handle 21 rides in a slot 23 that is provided in an extension 17' of the jaw 17. A coiled spring 24 connects the jaw extension 17' with the outer end of the handle 21. When the two handles are pressed toward each other, in being gripped by the hand of the operator, the jaw 18 is moved in a closing or cutting direction to sever the lead or slug that is passed between the jaws into engagement with the ear 12. When the cutting operation has been concluded and the grip upon the handles has been released the spring 24 serves to operate upon the handle 21 to open the jaw 18. A cutter made somewhat along the lines of the cutter illustrated is disclosed in United States Patent 1,263,492, dated April 23, 1918.

Changes may be made without departing from the invention.

Having thus described my invention, I claim:

1. In a gauge, the combination with a gauge bar having serrations therein to constitute it a rack; of a block slidable upon the gauge bar; a detent on said block movable transversely of the block and gauge bar, said detent being in the form of a bar bent upon itself, two of the sides of the bar receiving therebetween the gauge bar and block to maintain the block in contact with the gauge bar; and a tooth on the detent interengaging with the rack in one position of the detent.

2. In a gauge, the combination with a gauge bar which is angular in cross section to provide the bar with two angularly related sides extending lengthwise thereof, the outer face of one of said sides being serrated to constitute this bar side a rack, of a block in sliding engagement with the contiguous inner faces of said bar sides, a detent carried by the block and having portions between which said bar and block are received, said detent having a plurality of teeth adapted to engage simultaneously a plurality of teeth on said rack, and being spring pressed into engagement with said rack to hold the bar and block in relatively adjusted positions and being adapted to be manually pressed to release said block.

3. In a gauge, the combination with a gauge bar which is angular in cross section to provide the bar with two angularly related sides extending lengthwise thereof, the outer face of one of said sides being serrated to constitute this bar side a rack, of a block in sliding engagement with the contiguous inner faces of said bar sides, and a detent carried by said block and embracing said bar, said detent having a plurality of teeth adapted to engage simultaneously a plurality of teeth on said rack, said detent being spring pressed into engagement with said rack to hold the bar and block in relatively adjusted positions and being adapted to be manually pressed to release said block, said block having a slot in which the serrated side of the gauge bar is snugly received and which slot is entered by the gauge bar engaging end of the detent.

4. The structure of claim 3 wherein the detent is in the form of a bar having two portions between which the gauge bar and block are disposed and a third portion between the first two; the first two being angular with respect to such third portion and said third portion extending transversely of the gauge bar and between which and the gauge bar a portion of said block is disposed, one of the first two aforesaid portions of the detent being in changeable engagement with the rack bar.

5. The structure of claim 3 wherein the detent is in the form of a bar having two portions between which the gauge bar and block are disposed and a third portion between the first two, the first two being angular with respect to such third portion and said third portion extending transversely of the gauge bar and between which and the gauge bar a portion of said block is disposed, one of the first two aforesaid portions of the detent being in changeable engagement with the rack bar and wherein a spring is interposed between the block and the other of the first two aforesaid portions of the detent.

6. The structure of claim 3 wherein the detent is in the form of a bar having two portions between which the gauge bar and block are disposed and a third portion between the first two, the first two being angular with respect to such third portion and said third portion extending transversely of the gauge bar and between which and the gauge bar a portion of said block is disposed, one of the first two aforesaid portions of the detent being in changeable engagement with the rack bar and the other having a bent continuation which laps and is in close proximity to the adjacent outer face of the gauge bar.

7. The structure of claim 3 wherein the detent is in the form of a bar having two portions between which the gauge bar and block are disposed and a third portion between the first two, the first two being angular with respect to such third portion and said third portion extends transversely of the gauge bar and between which and the gauge bar a portion of said block is disposed, one of the first two aforesaid portions of the detent being in changeable engagement with the rack bar and the other having a bent continuation which laps and is in close proximity to the adjacent outer face of the gauge bar and wherein a spring is interposed between the block and the detent part having the bent continuation.

In witness whereof, I hereunto subscribe my name.

WILLIAM F. STUCKEMAN.